Dec. 9, 1924.

C. M. McCORD 1,518,209

MACHINE FOR WINDING LOOSE COILS FOR ARMATURES AND THE LIKE

Filed April 17, 1924

Inventor:
Claude M. McCord,
Rippey Kingsland,
His Attorneys.

Patented Dec. 9, 1924.

1,518,209

UNITED STATES PATENT OFFICE.

CLAUDE M. McCORD, OF RICHMOND HEIGHTS, MISSOURI.

MACHINE FOR WINDING LOOSE COILS FOR ARMATURES AND THE LIKE.

Application filed April 17, 1924. Serial No. 707,160.

*To all whom it may concern:*

Be it known that I, CLAUDE M. McCORD, a citizen of the United States, residing at Richmond Heights, St. Louis County, Missouri, have invented a new and useful Machine for Winding Loose Coils for Armatures and the like, of which the following is a specification.

This invention is a machine for winding loose coils for armatures and the like.

An object of the invention is to provide a machine that will wind coils upon four points or fingers spaced from the ends of an armature core or the like and at the same time will wind the coils in the slots of the armature core. After the coils are wound upon the four points or fingers the latter are removed from the coils leaving the coils wound in the slots of the armature core and extending appreciably a distance from the ends of the core, thereby providing loose coils that have not pulled sharply against any of the corners of the core.

Another object of the invention is to provide a machine embodying a structure and operating in the manner mentioned in the preceding paragraph and comprising means for supporting the armature core and the device, including the points or fingers, upon which the coils are wound as aforesaid, permitting the armature core to be turned and re-engaged with said device in an adjustment in which other coils may be wound upon said fingers or points in slots of the armature core. Thus each series of coils is of the same length as any other series of coils upon the armature, thereby providing an armature electrically balanced in that all coils are of the same resistance; whereas, where the wire is wound into the coils and pulled down upon the core at the ends the first coils are appreciably shorter than the last coils and hence of lower resistance making the armature electrically unbalanced.

Other objects will appear from the following description, reference being made to the accompanying drawings in which—

Figure 1:
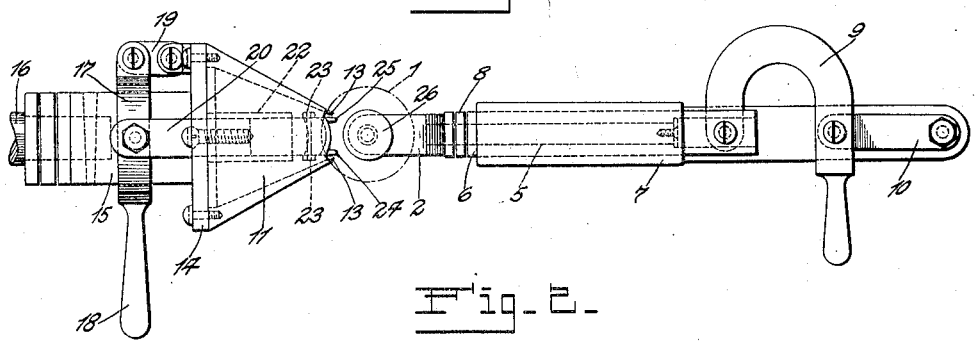
Fig. 1 is a view looking toward the end of the armature core engaged with the winding mechanism.

The armature core 1 is releasably supported in a cradle 2. A sleeve 3 provided with a number of wire engaging fingers 4 is removably connected with one end of the armature shaft. The cradle 2 is in rigid connection with a shaft 5 rotative in a sleeve 6 mounted for sliding movements in the machine frame 7. A thrust bearing 8 may be placed between the cradle 2 and the end of the sleeve 6. The opposite end of the sleeve 6 is connected with one end of a lever 9, the other arm of said lever 9 being pivoted to a toggle link 10. By manipulation of the lever 9 the cradle 2 may be moved toward and away from the winding mechanism.

Figure 2:
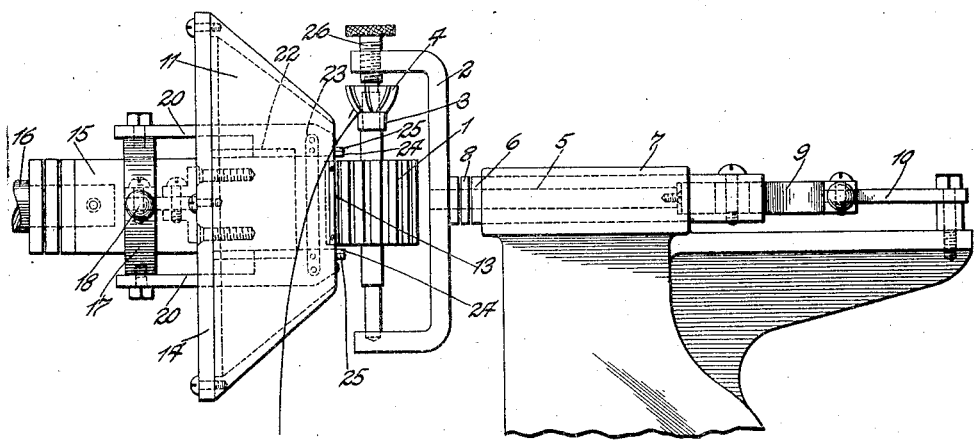
Fig. 2 is a side elevation of the machine with the winding mechanism engaging the armature core and the latter in a vertical position.
Figures 3, 4, 6:
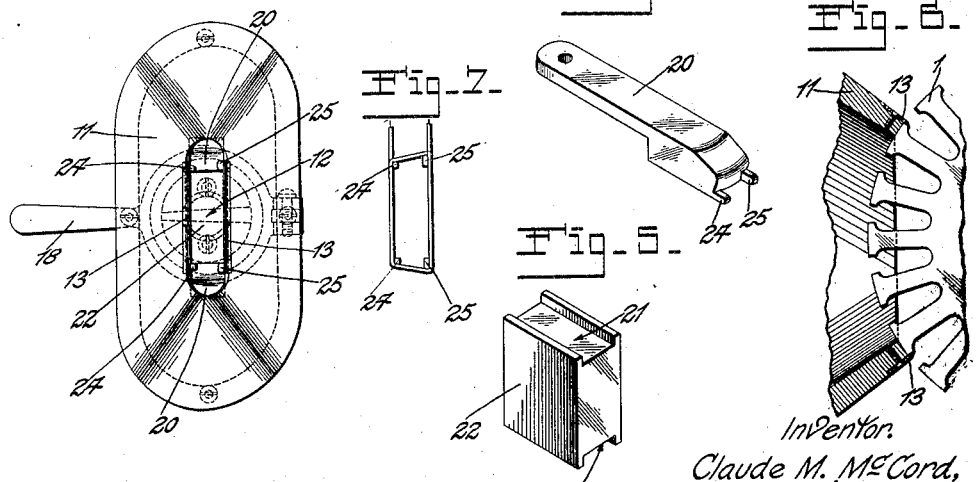
Fig. 3 is a side elevation of the head stock or device that engages the armature core and that supports the points or fingers upon which the coils are wound.
Fig. 4 is a perspective view of one of the elements, upon which the coils are wound, detached from the machine.
Fig. 6 is a relatively enlarged view showing in section the head stock or device that engages the armature core and that supports the points or fingers upon which the coils are wound.
Figures 5, 7:
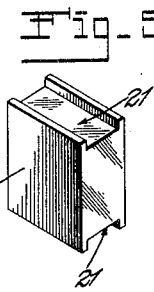
Fig. 5 is a perspective view of the guide block for the two parts one of which is shown in Fig. 4.
Fig. 7 is a view showing the form of the coils produced by operation of this machine.

The casting 11 comprises converging side walls merging integrally at rounded corners with the converging end walls so that the walls of said casting 11 are angular in four directions. A slot 12 is formed in the casting 11 providing an opening into which the adjacent part of the armature core 1 extends, but permitting the edges of the side walls of the casting 11 to bear against the peripheral surface of the armature core. Flanges or blades 13 in connection with the side walls of the casting 11 engage in the proper slots in the armature core 1 so that a wire moving from the walls of the casting 11 will enter the proper slots in the armature core. The armature core is thus engaged with the device 11 when the toggle 9—10 is extended, as shown in Figs. 1 and 2.

A casting 14 provided with a hub 15 is attached to the casting 11 opposite the slot 12 and is connected with a rotary drive shaft 16. A yoke lever 17 embraces the hub 15 and has a handle 18 extending from one side and has its opposite side pivoted to one end of a link 19 pivotally supported by the casting 14. A pair of sliding arms 20 have their outer ends pivoted to the yoke 17. Said arms extend through holes in the casting 14 and are supported for sliding movements in guide channels 21 in the ends of a block 22 secured to the casting 14 within the casting 11. Beyond the inner end of the casting 11 the arms 20 are connected by a tie-rod 23 which holds said arms in proper relationship and in the channels 21. The inner end of each of the arms 20 is provided with a projecting narrow coil supporting finger 24 and a wide coil supporting finger 25. In operative position the fingers 24 and 25 extend beyond the casting 11 at the ends of the armature core a distance sufficient to receive the coils wound on said fingers and placed in the slots in the core.

In operation of the machine the armature is placed in the cradle 2 in which it will be supported by engagement of one end of the armature shaft with a screw 26. The toggle device 9—10 is operated to engage the armature core with the winding device in the manner described in which engagement the flanges or blades 13 engage in slots in the armature core in position to guide the wire into said slots as the wire is wound upon the fingers 24 and 25 of the two arms 20. The wire for forming the coil to be wound is engaged with one of the fingers 24 and drawn in an angular direction across the inner portion of the casting 11 (Fig. 2). The casting 11 is then rotated, thereby rotating the armature core and, as an incident to such rotation, the wire slides from the inclined walls of the casting 11 onto the low fingers 24 and the high fingers 25 at the ends of the armature core and at the same time the wire enters the proper slots in the core. As the wire is wound into coils on the fingers 24 and 25 it obviously forms coils with one long side and one short side, thus permitting each adjacent successively formed coil to cross the preceding coils without strain or compression. The coils are thus wound upon the four fingers or points and, as an incident to such winding, are placed in the slots. After each coil is completed the points or fingers 24 and 25 are removed, leaving the coils loosely wound and without being sharply pulled against any corner of the armature and without being strained. All of the coils on the armature are electrically balanced in that the coils are of the same resistance throughout.

I am aware that the invention may be varied within equivalent limits without departure from the nature and principle thereof. I do not restrict myself unessentially, but what I claim and desire to secure by Letters Patent is:—

1. A machine of the character described comprising two pairs of spaced coil supporting fingers, a rotary support for said fingers, means for moving an armature core into engagement with said support between said pairs of fingers, and connections for rotating said support and thereby the armature core.

2. A machine of the character described comprising a support for an armature core, two pairs of spaced fingers, and a device supporting said fingers and engaging the armature core for rotating said fingers and the armature core about an axis and as an incident thereto winding a coil of wire upon said fingers and placing said coil in the slots of the armature core.

3. A machine of the character described comprising a casting having converging side and end walls, connections for rotating said casting, two pairs of spaced fingers supported by said casting, means for engaging an armature core with said casting between said pairs of fingers to rotate said armature core by said casting and as an incident thereto winding a coil of wire upon said fingers and placing said coil in the slots of the armature core.

4. A machine of the character described comprising a body having converging side and end walls, two pairs of spaced fingers supported by and extending beyond said body at the smaller side thereof, means for moving an armature core into and out of engagement with said body between said pairs of fingers, a connection for a wire, and means for rotating said body and thereby said armature core and as an incident thereto winding said wire upon said fingers and in the slots of the armature core.

5. A machine of the character described comprising a body having converging side and end walls, two pairs of spaced fingers supported by and extending beyond said body at the smaller side thereof, means for moving an armature core into and out of engagement with said body between said pairs of fingers, a connection for a wire, means for rotating said body and thereby said armature core and as an incident thereto winding said wire upon said fingers and in the slots of the armature core, and means for withdrawing the fingers from the windings of wire.

CLAUDE M. McCORD.